United States Patent
Lee et al.

(10) Patent No.: US 9,800,376 B1
(45) Date of Patent: Oct. 24, 2017

(54) FREQUENCY REUSE EFFICIENCY VIA INTERFERENCE AVOIDANCE FOR MULTI-BEAM SATELLITE COMMUNICATIONS NETWORK

(71) Applicants: Lin-Nan Lee, Potomac, MD (US); Liping Chen, Bethesda, MD (US); Anthony Noerpel, Lovettsville, MD (US); Stanley E. Kay, Rockville, MD (US)

(72) Inventors: Lin-Nan Lee, Potomac, MD (US); Liping Chen, Bethesda, MD (US); Anthony Noerpel, Lovettsville, MD (US); Stanley E. Kay, Rockville, MD (US)

(73) Assignee: Hughes Network Systems, L.L.C., Germantown, MD (US)

(*) Notice: Subject to any disclaimer, the term of this patent is extended or adjusted under 35 U.S.C. 154(b) by 2 days.

(21) Appl. No.: 15/096,467

(22) Filed: Apr. 12, 2016

(51) Int. Cl.
  *H04B 7/185* (2006.01)
  *H04B 7/19* (2006.01)
  (Continued)

(52) U.S. Cl.
  CPC ....... *H04L 5/0023* (2013.01); *H04B 7/18582* (2013.01); *H04W 16/14* (2013.01);
  (Continued)

(58) Field of Classification Search
  CPC .................................................. H04L 5/0023
  (Continued)

(56) References Cited

U.S. PATENT DOCUMENTS

| 4,188,578 A | 2/1980 | Reudink et al. |
| 6,859,652 B2 * | 2/2005 | Karabinis .......... H04B 7/18563 455/427 |

(Continued)

FOREIGN PATENT DOCUMENTS

WO  1996014692 A1  5/1996

OTHER PUBLICATIONS

International Search Report for corresponding PCT Application No. PCT/US2017/026469.

*Primary Examiner* — Tilahun B Gesesse
(74) *Attorney, Agent, or Firm* — Capitol City TechLaw; Jasbir Singh

(57) ABSTRACT

A high capacity communication system and method, and a high capacity communications configuration system are provided. The high capacity communication system includes a transmitter. The transmitter includes a signal generator to generate a signal including, wherein for a first frame portion extending from zero to τ time the signal is generated per a first color reuse plan of a frequency spectrum and one or more polarizations, and for a second frame portion extending from τ to T the signal is generated per a second color reuse plan of the frequency spectrum and the one or more polarizations; and an RF system to beam the signal concurrently to a first geographic area and a second geographic area. In the high capacity communication system, τ is less than T, the first frame portion is intended for a first VSAT population disposed in the first geographic coverage area and the second frame portion is intended for a second VSAT population disposed in the second geographic coverage area, and the first color reuse plan maps the frequency spectrum and the one or more polarizations into fewer colors than the second color reuse plan.

27 Claims, 7 Drawing Sheets

(51) Int. Cl.
  *H04B 1/04* (2006.01)
  *H04L 5/00* (2006.01)
  *H04W 16/28* (2009.01)
  *H04W 16/14* (2009.01)
  *H04W 72/08* (2009.01)
  *H04W 72/04* (2009.01)
(52) U.S. Cl.
  CPC ......... *H04W 16/28* (2013.01); *H04W 72/048* (2013.01); *H04W 72/082* (2013.01)
(58) Field of Classification Search
  USPC .......................... 455/114.2, 12.1, 13.1, 447
  See application file for complete search history.

(56) References Cited

U.S. PATENT DOCUMENTS

| | | | |
|---|---|---|---|
| 6,892,068 B2 * | 5/2005 | Karabinis | H04B 7/18539 |
| | | | 455/426.1 |
| 7,813,700 B2 * | 10/2010 | Zheng | H04B 7/18563 |
| | | | 455/12.1 |
| 9,236,934 B1 * | 1/2016 | Hudson | H04B 7/18513 |
| 2007/0192805 A1 | 8/2007 | Dutta et al. | |
| 2017/0099095 A1 * | 4/2017 | Wang | H04B 7/185 |

* cited by examiner

| input design parameter | example values |
|---|---|
| frequency allocation | 18.2-18.7 GHz<br>19.7-20.2 GHz |
| satellite orbit | Geostationary |
| terminal G/T (dB/°K) | |
| Total Satellite power (dBW) | |
| QoS (minimum bits/second/Hz/user) | |
| Capacity (bits/second/area) | |
| Coverage Area (km$^2$) | CONUS |
| Other satellite constraints size weight and power | |

| output design parameters | example values |
|---|---|
| satellite antenna aperture | |
| # cells | |
| peak to edge directivity ratio of a cell | |
| power per beam | |
| Area of subcells | |
| Duration τ | 50% |
| Frequency Reuse Plan | Hybrid 2/4 |

FIG. 9

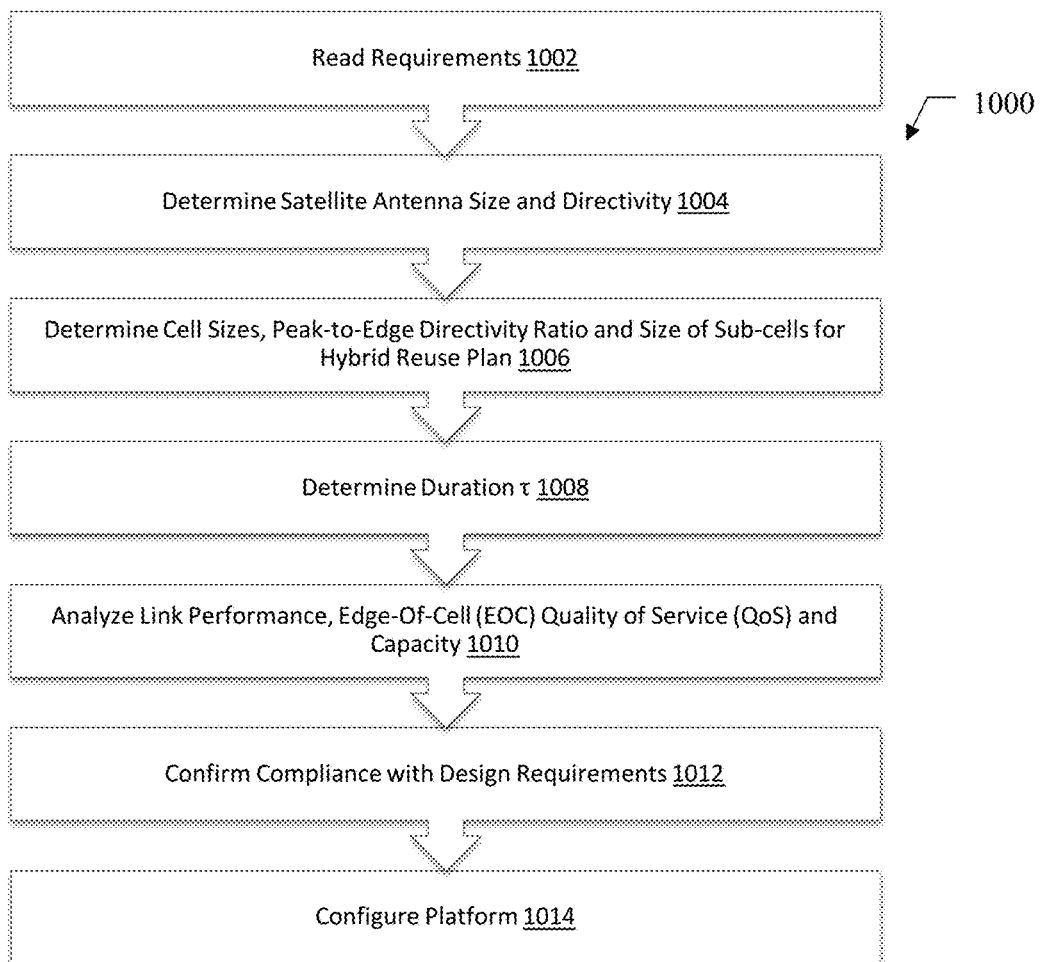

FIG. 10

FREQUENCY REUSE EFFICIENCY VIA INTERFERENCE AVOIDANCE FOR MULTI-BEAM SATELLITE COMMUNICATIONS NETWORK

FIELD OF THE INVENTION

The present teachings improve color reuse efficiency to increase the capacity of a multi-beam satellite system on the forward link or downlink from a satellite to a population of user terminals. The present teachings exploit an antenna far field pattern used on a typical multi-beam satellite system and use a hybrid-color reuse plan using time diversity to provide interference avoidance.

BACKGROUND

Multi-beam satellite systems routinely use antenna far field patterns and frequency/polarization or color reuse plans to provide discrimination between signals from other beams. Reuse of frequency/polarization allocations over the multiple spot beams generates co-channel interference among adjacent beams. Separating the frequency/polarization resource into multiple separate colors and using a multi-Color reuse plan provides discrimination between signals from other beams. An available frequency spectrum is divided into one or more frequency sub-bands. Some systems also use orthogonal polarizations to provide discrimination between signals. The colors of a reuse plan are mapped/assigned to the frequency sub-bands and one of the, possibly two, polarizations in use.

However, not using all the resources by dividing the frequency spectrum into sub-bands and/or polarizations reduces the beams capacity. There is a need to more efficiently utilize the frequency spectrum and/or polarization in multi-beam systems.

FIG. 1 illustrates a prior art beam laydown pattern with a 4-color reuse plan for a multi-beam satellite, according to various embodiments.

FIG. 1 illustrates a reuse plan combining signal polarization and non-overlapping frequency spectrums to create a 4-color reuse plan 100. In the example, the four colors (hashing in FIG. 1) correspond to four different frequency/polarization allocations. In FIG. 1, an available frequency spectrum is divided into two frequency sub-bands—F1 and F2—and each sub-band is assigned/mapped to a different color, and two orthogonal polarizations are assigned/mapped colors to provide the two other colors in the 4-color reuse plan. A service or coverage area 114 may be divided into cells. Multi-beam satellites typically illuminate multiple hexagonal cells within a service area 114. In exemplary embodiments, a cell 102 may be illuminated by a far field beam pattern using a right hand circularly polarized (RHCP) frequency spectrum such as 18.3 GHz to 18.8 GHz along with a cell 104 which may be illuminated by a far field beam pattern that uses a left hand circularly polarized (LHCP) for the same frequency spectrum, i.e., 18.3 GHz to 18.8 GHz. Furthermore, a cell 106 may be illuminated by a far field beam pattern using a RHCP frequency spectrum in a different frequency spectrum such as 19.7 GHz to 20.2 GHz, along with a cell 108 which may be illuminated by a far field beam pattern that uses a LHCP frequency spectrum in the same spectrum, i.e., 19.7 GHz to 20.2 GHz. A multi-beam satellite implementing a reuse plan may arrange the two polarizations in separate alternate rows, for example, a LHCP row 110 and a RHCP row 112. The alternate rows may reduce the interference between cells using the same circular polarization.

A three-color or seven-color reuse plan, each of which uses both polarizations, is also known. It is possible to tessellate a desired coverage area, such as, earth's surface, using an N-color reuse tessellate where N is any positive natural number. Without limitation, when polarization diversity is used, N is an even number.

In satellite communications, the frequency spectrum between 18.3 GHz to 18.8 GHz and 19.7 GHz to 20.2 GHz is allocated to the geostationary Fixed Satellite Service (FSS) on a primary basis in the United States. See, for example, FCC Online Table of Frequency Allocations, 47 C.F.R. §2.106. Allocations of frequency bands vary elsewhere and may differ in the future. The methods described in these teachings are extensible to other allocations.

SUMMARY

This Summary introduces a selection of concepts in a simplified form that is further described below in the Detailed Description. This Summary is not intended to identify key features or essential features of the claimed subject matter, nor is it intended to be used to limit the scope of the claimed subject matter.

As the far field antenna patterns overlap at the cell boundaries and because the side-lobes of the far field patterns illuminate even distant cells, every transmitted beam causes interference into every other co-channel cell, which reuses the same frequency/polarization pair. However, the present teachings take advantage of the nature of the far field beams, namely, that the interference from co-use beams is minimal in the center of cells and higher at the edge of the cell to increase system capacity. This nature is exploited by the present teachings by using a lower-color reuse plan to transmit information intended for user terminals within the center of a cell, a sub-cell of the cell and by using a higher-color reuse plan to transmit information to user terminals located towards the edge of a cell. Thus, the present teachings apply time-based color-reuse planning to avoid interference and to increase a multi-beam satellite system's capacity.

According to various embodiments, a high capacity communication system including a transmitter is provided. The transmitter includes a signal generator to generate a signal including, wherein for a first frame portion extending from zero to τ time the signal is generated per a first color reuse plan of a frequency spectrum and one or more polarizations, and for a second frame portion extending from τ to T the signal is generated per a second color reuse plan of the frequency spectrum and the one or more polarizations; and an RF system to beam the signal concurrently to a first geographic area and a second geographic area. In the system, τ is less than T, the first frame portion is intended for a first VSAT population disposed in the first geographic coverage area and the second frame portion is intended for a second VSAT population disposed in the second geographic coverage area, and the first color reuse plan maps the frequency spectrum and the one or more polarizations into fewer colors than the second color reuse plan.

According to various embodiments, a multi-beam high capacity communications system including a transmitter to cover a geographic coverage area divided into a target cell including an inner sub-cell and an outer sub-cell, and nearby cells is provided. The transmitter includes a first signal generator to generate a target signal intended for the target cell, wherein, for a first frame portion extending from zero to τ time the target signal is generated per a first color reuse plan of a frequency spectrum and one or more polarizations, and for a second frame portion extending from τ to T the target signal is generated per a second color reuse plan of the frequency spectrum and the one or more polarizations; a second signal generator to generate nearby signals intended for a corresponding one of the nearby cells, each of the nearby signals including the frequency spectrum and the one or more polarizations; and a Radio Frequency (RF) system to concurrently focus the target signal as a target beam on the target cell and each of the nearby signals as nearby beams on the corresponding nearby cell. In the system, τ is less than T, the first frame portion is intended for a first VSAT population disposed in the inner sub-cell and the second frame portion is intended for a second VSAT population disposed in the outer sub-cell, and the first color reuse plan maps the frequency spectrum and the one or more polarizations into fewer colors than the second color reuse plan.

According to various embodiments, a method for communicating in a multi-beam high capacity communications system covering a geographic coverage area divided into a target cell including an inner sub-cell and an outer sub-cell, and nearby cells is provided. The method includes: generating a target signal intended for the target cell, wherein, for a first frame portion extending from zero to τ time the target signal is generated per a first color reuse plan of a frequency spectrum and one or more polarizations, and for a second frame portion extending from τ to T the target signal is generated per a second color reuse plan of the frequency spectrum and the one or more polarizations; generating nearby signals intended for a corresponding one of the nearby cells, each of the nearby signals including the frequency spectrum and the one or more polarizations; and concurrently beaming the target signal as a target beam on the target cell and each of the nearby signals as nearby beams on the corresponding nearby cell. In the process, τ is less than T, the first frame portion is intended for a first VSAT population disposed in the inner sub-cell and the second frame portion is intended for a second VSAT population disposed in the outer sub-cell, and the first color reuse plan maps the frequency spectrum and the one or more polarizations into fewer colors than the second color reuse plan.

According to various embodiments, a high capacity communications configuration system to configure a high attitude platform or satellite focused on a geographic coverage area divided into a target cell including an inner sub-cell and an outer sub-cell, and nearby cells is provided. The system includes: a first frequency reuse plan of a frequency spectrum and one or more polarizations for generating a first frame portion of a signal extending from zero to τ time, wherein the first frame portion is to be transmitted to a first VSAT population disposed in the inner sub-cell; a second frequency reuse plan of the frequency spectrum and the one or more polarizations for generating a second frame portion extending from T to T, wherein the second frame portion is to be transmitted to a second VSAT population disposed in the outer sub-cell; and a system configuration manager to determine a size and disposition of the target cell and each of the nearby cells, and to determine a size and disposition of the inner sub-cell and the outer sub-cell. In the system, T is a duration of a frame including the first frame portion and the second portion, τ is less than T, and the first color reuse plan maps the frequency spectrum and the one or more polarizations into fewer colors than the second color reuse plan.

DRAWINGS

In order to describe the manner in which the above-recited and other advantages and features can be obtained, a more particular description is provided below and will be rendered by reference to specific embodiments thereof that are illustrated in the appended drawings. Understanding that these drawings depict only typical embodiments and are not therefore to be considered to be limiting of its scope, implementations will be described and explained with additional specificity and detail with the accompanying drawings.

Figure 5:
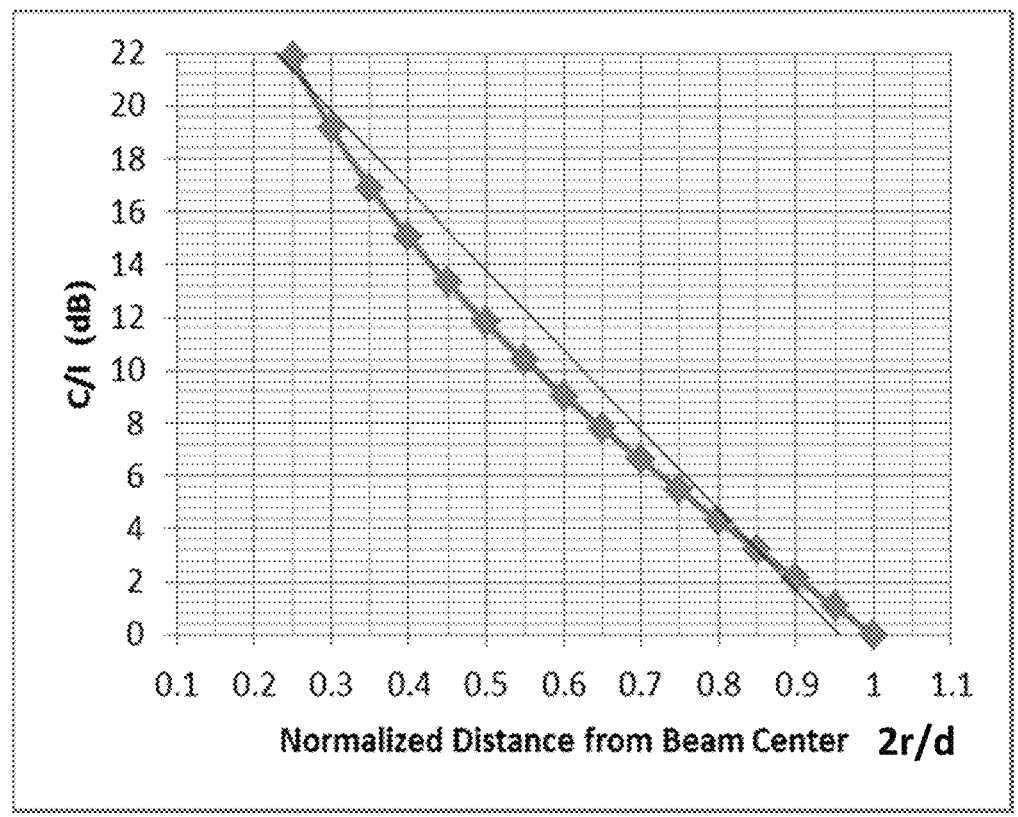

FIG. 5 plots Carrier to Interference ratio (C/I) between adjacent beams as a function of normalized distance between beam center to beam edge, according to various embodiments.

Figure 6A:
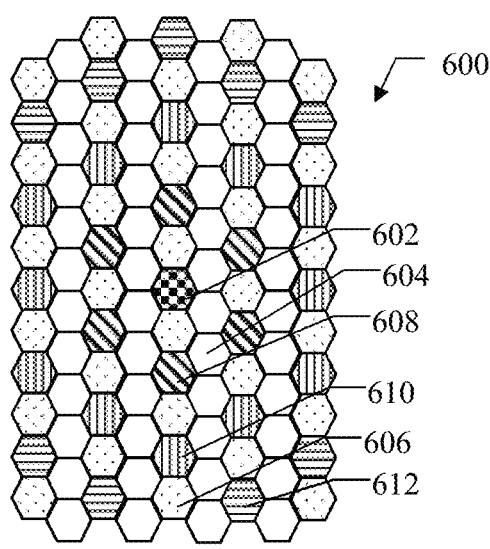

FIG. 6A identifies the interfering beams, by the cells which they illuminate, into a target cell when using a 4-color reuse plan utilizing two frequency spectral sub-bands or regimes and two polarizations, according to various embodiments.

Figure 6B:
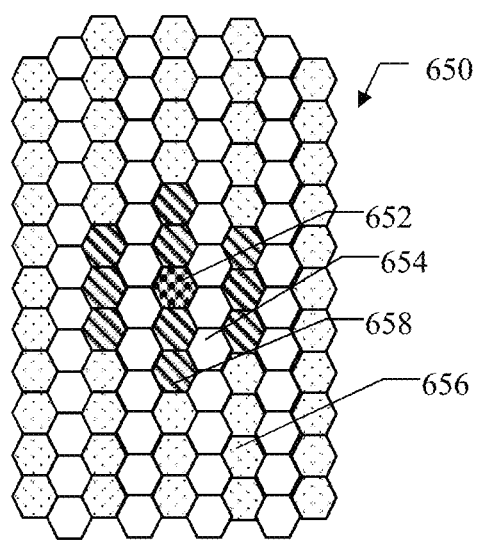

FIG. 6B identifies the interfering beams, by the cells which they illuminate, into a target cell when using a 2-color reuse plan utilizing effectively using one frequency spectral sub-band or regime and two polarizations, according to various embodiments.

Figure 7:
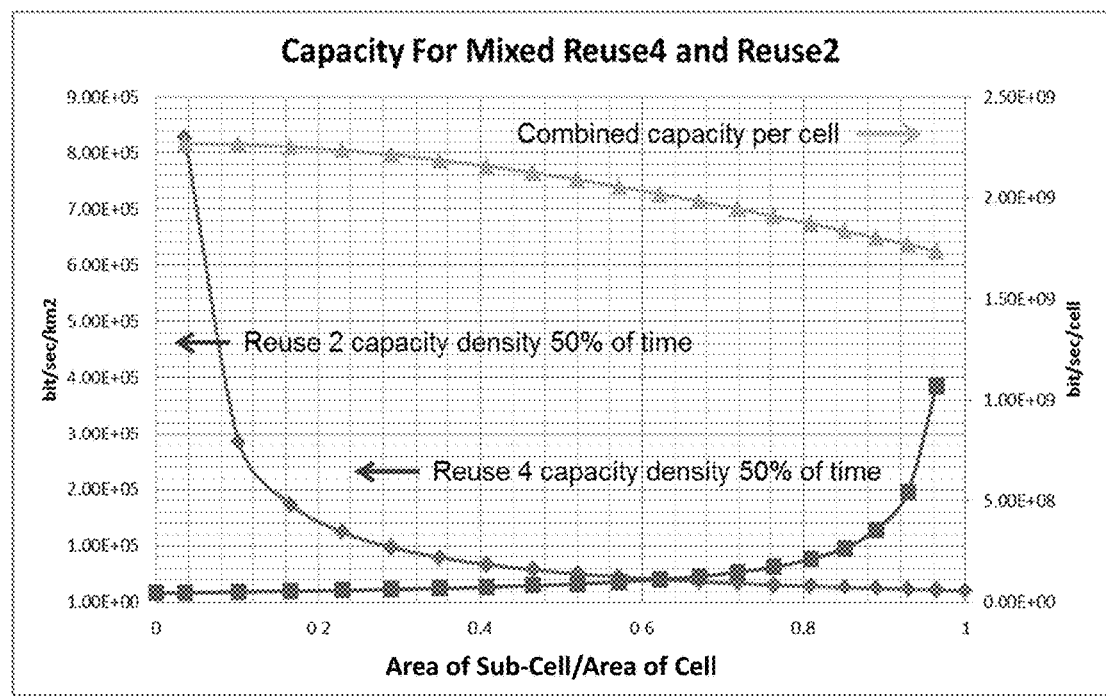

FIG. 7 illustrates total traffic capacity using the current teachings, assuming reuse factors 2 and 4 with a C/N of 14 dB at the beam center, as a function of the area of the sub-cell divided by the total area of the cell, according to various embodiments.

Figure 8:
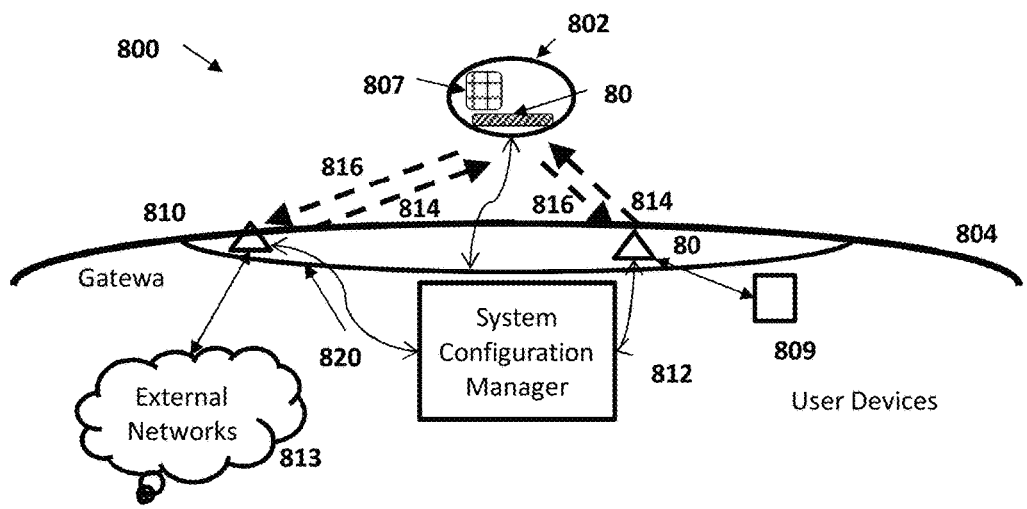

FIG. 8 diagrams an exemplary telecommunications communication system, according to an example embodiment of the present disclosure.

FIG. 9 shows the parametric inputs to the system configuration manager and outputs of the system configuration manager, according to an example embodiment.

FIG. 10 illustrates a flow diagram showing an example procedure to configure antennas on a satellite to produce cells with a similar or substantially uniform spatial spectral density, according to an example embodiment.

Figure 11:
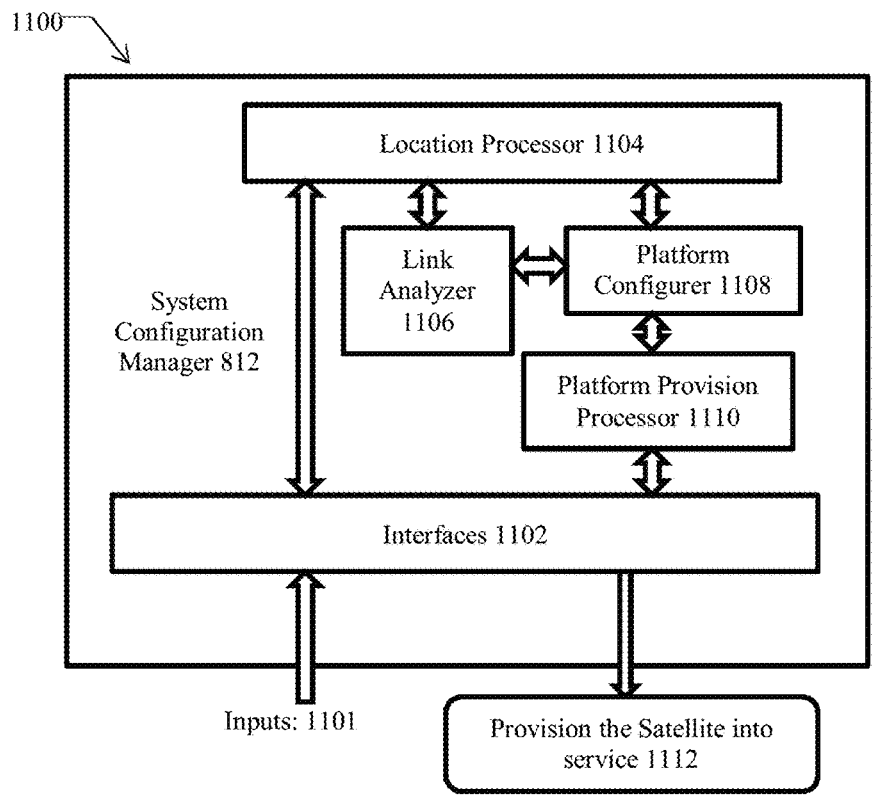

FIG. 11 shows a block diagram example of a configuration manager, according to an example embodiment.

Figure 12:
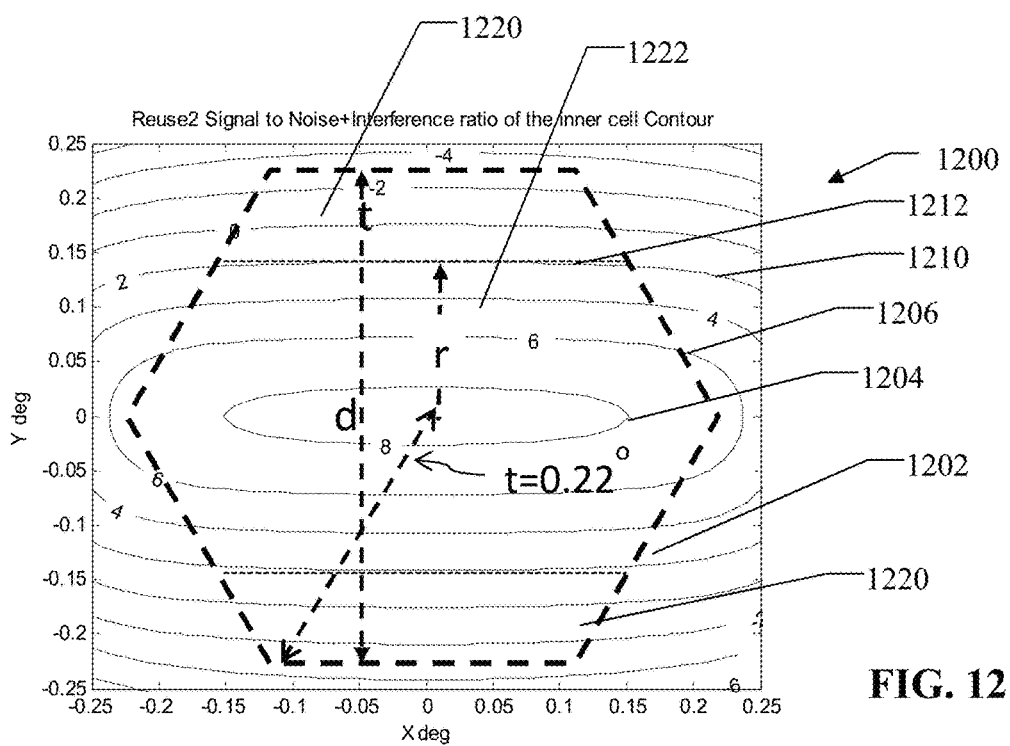

FIG. 12 shows Carrier signal-to-Noise+Interference ratio (C/I+N) contours overlaying a hexagonal cell boundary for the example system.

Figure 13:
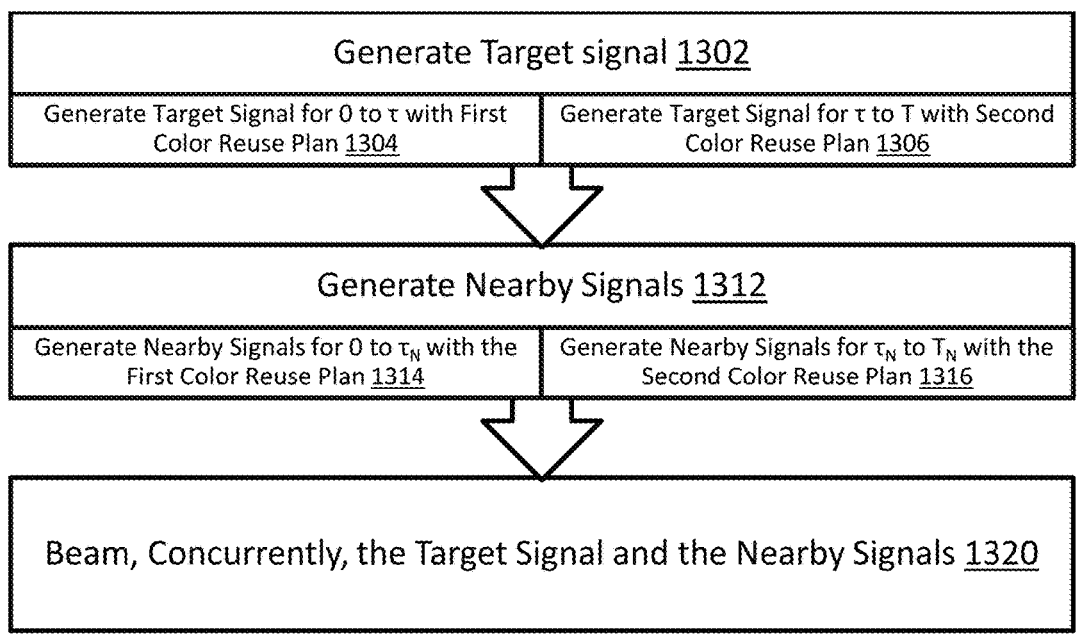

FIG. 13 illustrates a process for communicating in a multi-beam high capacity communications system that covers a geographic coverage area divided into a target cell including an inner sub-cell and an outer sub-cell, and nearby cells.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

Multi-beam satellites typically illuminate multiple hexagonal cells within a service area. The far field directivity of a typical reflector antenna with a circular aperture can be approximated by:

$$2G(0)J_1(ka \sin \theta)/(ka \sin \theta) \qquad \text{EQ. 1}$$

where G(0) is the boresight directivity $J_1(x)$ is the Bessel function of the first kind with argument x, $k=2\pi f/c$ is the wave number, f is the frequency of operation, c is the speed of light in a vacuum and θ is the angle measured from the bore sight of the antenna's main beam. The radius of the antenna's circular aperture is a, and the directivity at θ normalized to the peak directivity is given by $2J_1(ka \sin \theta)/(ka \sin \theta)$. Typically, the main lobe of the antenna pattern is called a beam and the coverage area on the surface which is illuminated by the beam is called a cell. Without limitation, generally, the beam is a physical property of the antenna radiation pattern and the cell is a logical construct on the surface. Generally, the desired signal to interference ratio at the edge of the cell determines how closely the cells using the same frequency are placed.

For a 1-color reuse plan, all the cells are allocated the same frequency and polarization. In this case, user terminals at the edge of the cell experience a high level of interference. Generally, multi-beam satellite systems avoid using the same frequency and polarization in adjacent neighbor cells and employ higher color reuse plans. Multi-beam satellite systems often use polarization diversity in addition to frequency diversity when allocating frequency spectrum to cells. Generally, interference between any two orthogonal polarizations is low.

In exemplary embodiments, the present teachings disclose a 2-color reuse plan with the same antenna beam response and cell laydown for part of the time in conjunction with the 4-color reuse plan the rest of the time. In exemplary embodiments, each beam is able to use the 2-color reuse plan at least some of the time, thereby potentially increasing the frequency reuse efficiency of the present teachings relative to a standard 4-color reuse plan. This frequency reuse plan may be called a hybrid reuse plan, for example, a hybrid ⅔ reuse plan. In exemplary embodiments, hardware complexity, implementation and configuration, and other limitations may limit the actual increase in capacity of the satellite system.

Figure 1:
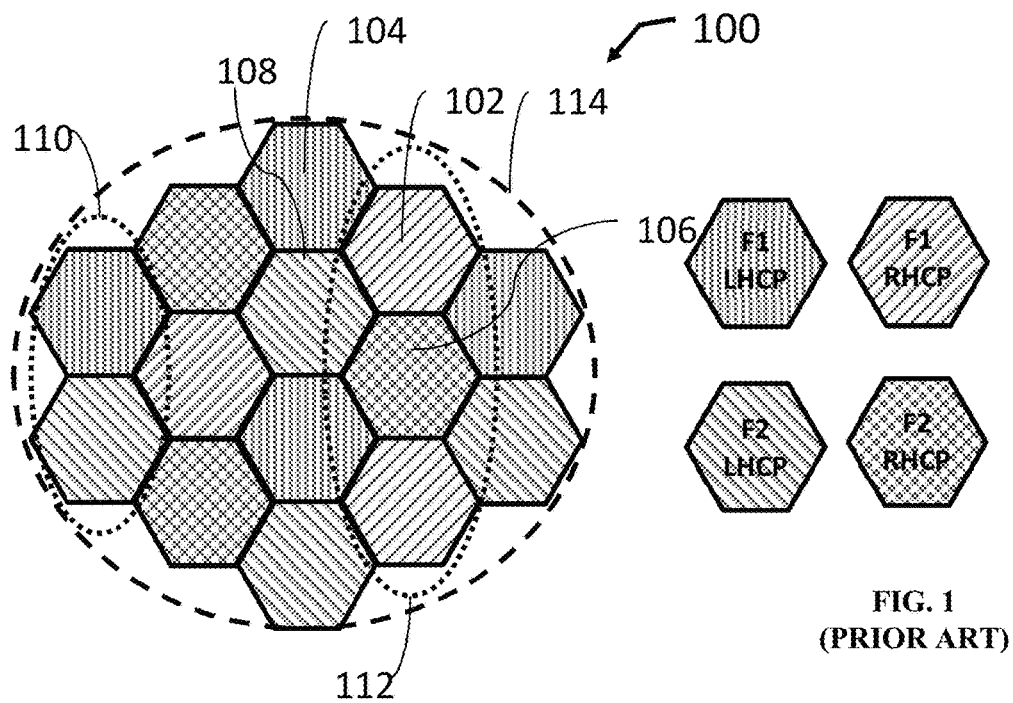
FIG. 1 illustrates a prior art beam laydown pattern with a 4-color reuse plan for a multi-beam satellite, according to various embodiments.
Figure 2:
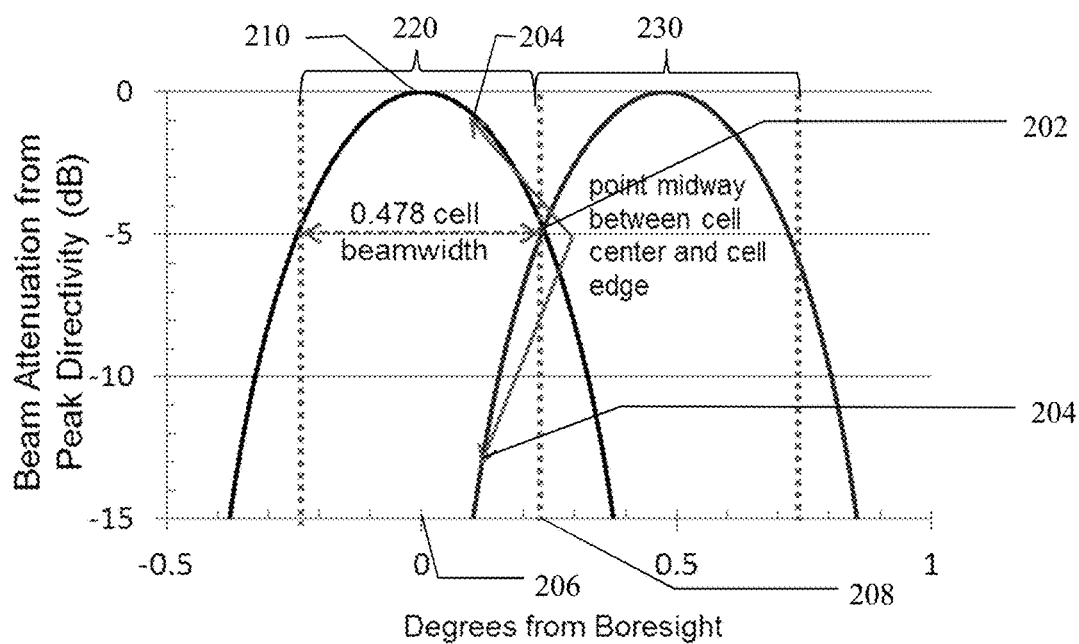
FIG. 2 illustrates a far field directivity pattern of an antenna for two adjacent beams, according to various embodiments.

FIG. 2 illustrates a far field directivity pattern of an antenna for two adjacent beams, according to various embodiments.

In exemplary embodiments, FIG. 2 illustrates far-field antenna pattern cuts 200 for two beams illuminating adjacent cells using a 2.6-meter antenna with 78% efficiency.

The hybrid time-based frequency planning configuration avoids interference to increase the capacity of a multi-beam communications satellite system. At the intersection (for example, at point 202 along cell boundary 208) of the two beams, or on the beam edge, the directivity of the two beams is the same. If the signals on both beams are transmitted at the same power level, a receiver on the beam edge 208 receives each signal with equal power. In this example, the directivity at the edge of the beam is 4.8 dB below the peak directivity 210 at the beam center 206. This value is typical for a multi-beam satellite system. Since the normalized directivity is given by $2J_1(ka \sin \theta)/(ka \sin \theta)$, the directivity of the adjacent beam has dropped by 12.9 dB from its peak at the midpoint 204 between the cell edge 208 and cell center 206, whereas the directivity of the beam has only dropped by 1.1 dB. In other words, the signal-to-interference ratio from an adjacent cell 230 at this point is 11.8 dB, and presents an opportunity to reuse the same frequency used by the adjacent cell 230 in a target cell 220.

However, if this same frequency is used in both adjacent cells, the two signals in each beam will interfere with each other near the cell boundary. If these signals are transmitted at equal power signal then the signal to interference ratio will be 0 dB at the boundary. Since there are contributions from other beams as well as thermal noise, the C/(N+I) will be negative. The present teachings use time domain isolation in addition to antenna beam discrimination to avoid interference by, (1) transmitting information packets to user terminals in the central region of a cell during a period when both the target cell 220 and the adjacent cell 230 are using a 2-color reuse, and (2) transmitting information packets to user terminals at the edge of the cell during a period when each cell uses a 4-color reuse.

Figure 3:
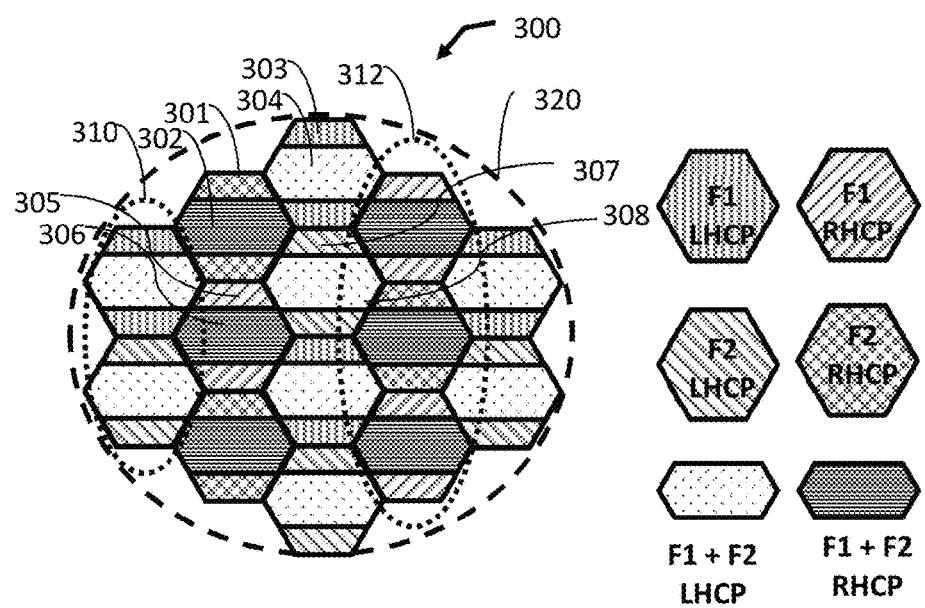
FIG. 3 illustrates a hybrid ⅔-color reuse plan, according to various embodiments.

FIG. 3 illustrates a hybrid ⅔-color reuse plan, according to various embodiments.

FIG. 3 illustrates a concept of reusing an adjacent cell frequency in a target cell of a 4-color reuse plan to form a 2-color reuse plan in portions of the 4-color reuse plan to form a hybrid ⅔-color reuse plan 300. Multi-beam satellites typically illuminate multiple hexagonal cells within a service or coverage area 320. A multi-beam satellite's coverage area 320 may include multiple hexagonal cells. In exemplary embodiments, the multi-beam satellite implementing a reuse plan may utilize two polarizations to transmit signals, and the reuse plan may arrange the two polarizations in separate alternate rows of hexagonal cells within the signal or coverage area 320.

In exemplary embodiments, a hybrid ⅔-color reuse plan 300 may arrange the two polarizations in separate alternate rows to maintain polarization isolation between adjacent rows, for example. a left-hand circular polarization (LHCP) row 310 and a right-hand circular polarization (RHCP) row 312.

In exemplary embodiments, an inner sub-cell or cell-center 302, 304, 306, 308 may be defined within a hexagon-shaped cell 301, 303, 305, 307. In some embodiments, the inner sub-cells 302, 304, 306, 308 may be shaped substantially as an elongated hexagon. In some embodiments, the inner sub-cells 302, 304, 306, 308 may be irregularly shaped. A portion of the cell 301, 303, 305, 307 that does not overlap or intersect with the inner sub-cell 302, 304, 36, 308, respectively, may be known as a sub-cell at the edge of the cell or an outer sub-cell 311, 313, 315, 317, respectively (for example, the portion of cell 301 that is not included in the inner sub-cell 302 in FIG. 3). In some embodiments, interference avoidance can take advantage of the LHCP rows 310 being interleaved or alternated with the RHCP rows 312. The sub-cell boundary, which is not necessarily a straight line, may be set to include all user terminal locations which experience a C/(N+I) above a given threshold.

Figure 4:
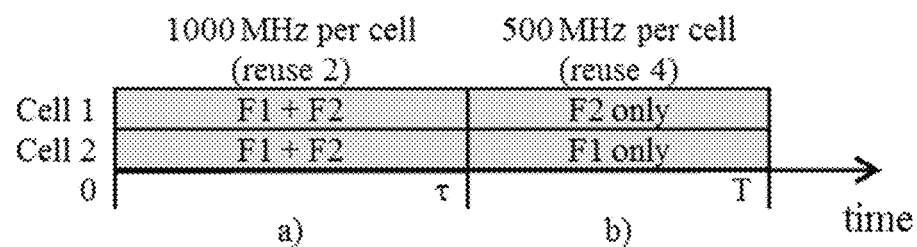
FIG. 4 illustrates frame timing of information flow and frequency transmission between two adjacent cells for transmission of packets to user terminals in their respective center region and edge region for interference avoidance, according to various embodiments.

FIG. 4 illustrates frame timing of information flow and frequency transmission between two adjacent cells for transmission of packets to user terminals in their respective center region and edge region for interference avoidance, according to various embodiments.

FIG. 4 illustrates a time period of duration τ wherein signals using both frequencies are transmitted in both cells with packets intended for user terminals near the central region or sub-cell of each cell effectively using a 2-color reuse plan. FIG. 4 also illustrates a timer period of duration T−τ effectively using a 4-color reuse plan.

In exemplary embodiments, a frame with duration T may be divided into two parts, the first of time duration τ and the second of time duration T−τ. During the first part τ of the frame T, both colors are used from time 0 to time τ and the transmitted signal may include packets intended for user terminals in the sub-cells 302, 304, 306, 308. During the second part of the frame T−τ, only one color is used from time τ to T and the transmitted signal may include packets intended for user terminals in the outer sub-cells 311, 313, 315, 317. Thus, during a part or portion of the frame, the VSATs near the cell center enjoy the capacity of a 2-color reuse plan or in this example 1000 MHz. During the remainder of the frame, the system has the capacity of a four-color plan or in this example 500 MHz but can maintain a good link to the user terminals at the edge of the cell. The sub-cells 302, 304, 306, 308 are logical constructs and terminals can be allocated either frequency bands depending on traffic demand, for example, instantaneous traffic demand.

FIG. 5 plots Carrier to Interference ratio (C/I) between adjacent beams as a function of normalized distance between a cell center and a cell edge, 2r/d, where d is the distance between any two parallel sides of the hexagon. A side has length t. The distance between the center of the hexagon and the point where three cells intersect is equal to the length of the cell, t. All lengths have dimensions in degrees as measured from the satellite antenna.

Even though a normalized directivity $2J_1(ka \sin \theta)/(ka \sin \theta)$ is nonlinear, the ratio between the beam directivities from two adjacent beams for a given location is nearly linear in decibel scale for most of the range as seen in FIG. 5. As is evident from FIG. 5, the C/I as a function of distance between a cell center to a cell edge is linear, if the two beams are transmitted at equal power.

Without limitation, the cell center region may experience some interference from the adjacent beam. The degradation caused by such interference depends on the operating Carrier to Noise ratio (C/N) and the location of the receiver. If the C/I is equal to the C/N, the degradation due to the interference will be equal to 3 dB. If the C/I is lower than the C/N, it will be the major contributor to signal degradation. If the C/I is significantly higher than the C/N, the degradation due to the interference alone is small relative to that due to the noise. To illustrate this point, assume that the beam center has a C/N of 14 dB for the user terminals defined for the system, i.e., as a consequence of the user terminal system noise temperature. By example, consider the point 204 midway between the center 206 and the edge 208 of the cell as illustrated in FIG. 2. The C/N experienced by a user terminal at this point is 12.9 dB, i.e., 1.1 dB below the C/N experienced by the user terminal in the center of the beam, which is capable of supporting 3.11 bit/sym using 16-APSK and rate 7/9 code assuming the DVB-S2 modulation and coding modes by example. However, it experiences a C/I of 11.8 dB interference from the adjacent beam. So, the Carrier to (Noise plus Interference) ratio (C/(N+I)) is 9.3 dB, which can support 16-APSK with rate 26/45 coding or 2.3 bits/symbol. For a user terminal located at one-fourth (¼) of the normalized distance from the beam center, the C/I is 22 dB and the C/N is 14 dB. Thus, C/(N+I) is 13.4 dB and is dominated by the noise. The degradation due to the interference is 0.6 dB, resulting in modest throughput reduction.

FIG. 6A identifies the interfering beams, by the cells which they illuminate, into a target cell when using a 4-color reuse plan utilizing two frequency spectral sub-bands and two polarizations, according to various embodiments.

In exemplary embodiments, the performance of the teachings disclosed herein can be analyzed using a time multiplex of two different reuse factors. The following example assumes a duty cycle of 50% or τ=0.5 T. Of course τ can be between 0 and IT. A value of 0 corresponds to a 4-color reuse plan and a value of IT corresponds to a 2-color reuse plan. Further τ can be different in each cell of a satellite system coverage area.

As shown in FIG. 6A, when a 4-color reuse plan 600 is operational, for example, during a portion of a frame such as the duration from τ to T, a target cell 602 receives signals having a first circular polarization in a frequency band F1, while a non-target cell 606 (dotted hash marked cells) may receive signals having the first circular polarization in a frequency band F2 that is different than F1 to minimize interference. In the frequency band F1, the target cell 602 may have a plurality of primary interferers 608 (from beams illuminating diagonal hash marked cells), a plurality of secondary interferers 610 (from beams illuminating vertical hash marked cells), and a plurality of tertiary interferers 612 (from beams illuminating horizontal hash marked cells). The target cell 602 may receive a stronger interfering signal from the primary interferers 608 as compared to an interfering signal received from the secondary interferers 610. The target cell 602 may receive a stronger interfering signal from the secondary interferers 610 as compared to an interfering signal received from the tertiary interferers 612.

The 4-color reuse plan 600 also includes cells 604 (cells without hash marks) receiving signals having a second circular polarization that is different from the first circular polarization. In exemplary embodiments, the first circular polarization may be LHCP while the second circular polarization may be RHCP. Signals to cells 604 may use the frequency bands F1 and F2. Cells 604 may be disposed in alternating rows to increase the separation between the target cell 602 and the cells reusing the same frequency and polarization as the target cell.

FIG. 6B identifies the interfering beams, by the cells which they illuminate, into a target cell when using a 2-color reuse plan utilizing effectively using one frequency spectral sub-band or regime and two polarizations, according to various embodiments.

As shown in FIG. 6B, when a 2-color reuse plan 650 is operational, for example, during a portion of a frame such as the duration from 0 to τ, a target cell 652 (checkered hash marked cells) is illuminated by a beam having a first circular polarization in both frequency bands F1 and F2. The target cell 652 may receive interference from a plurality of primary interfering beams which are illuminating cells 658 (diagonal hash marked cells).

The 2-color reuse plan 650 also includes cells 654 (cells without hash marks) receiving signals having a second circular polarization that is different from the first circular polarization. In exemplary embodiments, the first circular polarization may be LHCP while the second circular polarization may be RHCP. Signals to cells 654 may use the frequency bands F1 and F2. Cells 654 may be disposed in alternating rows to increase the separation between the target cell 652 and the cells reusing the same frequency and polarization as the target cell.

In exemplary embodiments, assume that the C/N at the cell center is 14 dB for all the cells. If each cell is filled with 1287 uniformly distributed user terminals, it is possible to calculate the C/N and C/I at each location for both the 2-color reuse and the 4-color reuse. After obtaining the C/N and C/I, the C/(N+I) can be calculated for both reuse factors. When using a supported and efficient modulation and coding scheme (modcod), such as, DVB-S2X, a capacity for the link at that location for both reuse conditions may be derived. For comparison purposes however Shannon capacity is used herein. For this calculation, we define the boundary between the cell center region and cell edge region by the distance parameter, r. We also assume that the peak-to-edge crossover is −4 dB and that each carrier is 500 Msym/sec which for a 2.4 meter antenna corresponds to a distance from the cell center to the cell triple crossing point of t=0.22 degrees. The numerical results are presented in the following table:

| Reuse (Note 1) | bps/Hz | Spectrum (Mhz) | Shannon Capacity (Gbits/sec/cell) |
|---|---|---|---|
| Hybrid 2/4 | 2.692 | 750 | 2.019 |
| 4 | 3.324 | 500 | 1.662 |

Note 1
The Hybrid plan numbers assume a 50% duty cycle.

FIG. 12 shows Carrier signal-to-Noise+Interference ratio (C/I+N) contours overlaying a hexagonal cell boundary for the example system.

FIG. 12 shows the Carrier signal-to-Noise+Interference ratio C/(I+N) in a cell 1202. The area of the cell 1202 is superimposed. Note that the contour lines along which the C/(I+N) is equal are nearly linear. By defining a sub-cell by the distance r from the cell center to the contour line with the desired value of C/(I+N) then user terminals inside the sub-cell will all receive signals with the desired value or greater. The length of any edge of the hexagonal cell is t and this is the distance from the cell center to the vertex where three adjacent cells meet. The distance between two parallel sides of the hexagonal cell is d. The above table shows that if the area of the center sub-cell is about 60% of the cell area, the traffic density of the two regions can be made substantially equal. In this case d/2=0.866 t=0.19 degrees and r=0.14 degrees. At this point, the total capacity of the hybrid ⅔-color plan is 2.019 Giga bits per second (Gbps) versus the total capacity of the original 4-color reuse plan of 1.66 Gbps, an increase of 25.9%.

Given the above parameters, without limitation, one can calculate the traffic density per cell region or the total traffic normalized to an area. Assuming that the total cell area is 49,636 km$^2$, and that the two cell regions are separated by a straight line parallel to the cell edge between two adjacent cells as illustrated in FIG. 3. The size of the cell is based on a Ka-band satellite with 2.4 m reflector using the frequency allocation described above. The capacity density is scalable with respect to cell size without loss of generality within a reasonable range of beam crossover points or peak-to-edge ratios.

FIG. 7 illustrates total traffic capacity using the current teachings, assuming reuse factors 2 and 4 with a C/N of 14 dB at the beam center, as a function of the area of a sub-cell to the total area of a cell, and the traffic density of the two regions.

In FIG. 7, the horizontal axis is the area of center cell region over the total cell area. In exemplary embodiments, when a duty cycle is 50% for a Hybrid ⅔-color reuse plan using two frequency bands of 500 MHz each, a targeted cell may be serviced using 1000 MHz at 2.51 bps/Hz for half of a frame duration and 500 MHz at 3.06 bps/Hz the other half of the frame's duration. This bandwidth is reflected as a capacity of 2.019 Gbps as shown in the Table above. From a satellite hardware perspective, the hybrid ⅔-color reuse plan is effectively using 750 MHz per beam to provide a spectral efficiency of 2019/750=2.69 bits per second per Hertz (bps/Hz).

As such, the Hybrid ⅔-color reuse plan may provide a capacity close to the 2-color reuse plan. In exemplary embodiments, the Hybrid ⅔-color reuse plan may provide nearly the same capacity as a 2-color plan but with less hardware at the satellite and/or terminals.

In various embodiments, the time-sharing plan may be extended to other duty cycle values. Both the duty cycle and sub-cell size may be different for each cell and may be dynamically adjusted to meet varying traffic demand. In exemplary embodiments, a hybrid one/two (½)-color or a hybrid three/six (⅜)-color or a hybrid four/eight (⅘)-color plan may be implemented. In exemplary embodiments, other hybrid time-sharing reuse plans may be implemented.

Hardware Embodiment

In an example embodiment, a telecommunications platform or transceiver apparatus includes a plurality of beams, which might be formed by a single phased array antenna or by a plurality of antennas, to provide communication links between a gateway station and a plurality of user terminals within a specified coverage area on the ground, each user link beam to provide communication links with user terminals located in a specified cell within the specified coverage area and each gateway link beam to provide communications with a specific gateway. A system configuration management apparatus includes logical links to platforms, gateways and user terminals to receive status, location, capacity requirements and other management information and to download configuration and provisioning parameters. The system configuration manager also includes system design planning and updating functions. As discussed herein, planning includes the design of cells and sub-cells, their number, sizes, and a color reuse plan for the satellite system coverage area.

Communication Environment

FIG. 8 diagrams an exemplary telecommunications communication system, according to an example embodiment of the present disclosure.

A satellite communication system 800 includes a platform 802 (for example, a satellite, an airplane, a balloon, or the like) configured to operate in a specified orbit above the Earth's surface 804. For instance, the platform 802 may operate in the geostationary Earth orbit. In some embodiments, the geostationary Earth orbit may be 35,786 km above the surface of the Earth. In exemplary embodiments, the platform 802 may be replaced by any other suitable communications satellite or platform.

The platform 802 includes antennas 806 in addition to hardware 807 to facilitate the relay of communications between user devices 808 and a gateway 810. Hardware 807 may include one or more of a receiver, transmitter, modem, router, filter, amplifier, frequency translator, processor, or the like. In exemplary embodiments, the platform 802 may have a transponder bent-pipe design for relaying communications signals between a gateway 810 and user terminals 808. User terminals 808 may be dispersed in multiple cells. In some embodiments, the platform 802 may include processing, switching or routing capability so that circuits may be switched or individual packets may be routed between different cells. The communications signals transmitted to/from the platform 802 can be any combination of standard or proprietary waveforms. The gateway 810 may be connected to any combination of communications networks, such as, intra-nets, inter-nets, or the Internet.

The user terminal 808 can be any terminal capable of communicating with the platform 802. The user terminal 808 may facilitate the exchange of data with the platform 802 with the use of an antenna, transceiver, processor and the like. The user terminal 808 may be connected to communications equipment or a user device 809, such as, a router, switch, phone or computer. The user terminal 808 may include a mobile platform, a fixed platform or a movable platform.

The gateway 810 may be a centralized transceiver connected to a network 813. The network 813 may include an external network, such as, the Public Switched Telephone Network (PSTN), Internet, a LAN, a virtual LAN, a private LAN, and the like. The network 813 may be a packet switched network or a circuit switched network. The gateway 810 may include one or more base stations, antennas, transmitter, receiver, processor, or the like. The gateway 810 may convert data received from the network 813 into signals for wireless transmission to the platform 802 and convert data received from the platform 802 into signals for transmission to the network 813. In exemplary embodiments, the platform 802 may be in communication with more than one gateway 810. In some embodiments, the gateway 810 may be in communication with more than one platform 802. In these instances, the gateway 810 may select which platform 802 is to communicate the data based on, for example, a destination of the data, a requested Quality of Service (QoS), network congestion, availability, or the like.

The user terminal 808 and the gateway 810 may communicate with the platform 802 via uplinks 814 and downlinks 816. The links 814 and 816 may use spot beams provided by the platform 802 to cover specified cells, where a targeted user terminal 808 and/or gateway 810 is disposed. In exemplary embodiments, a spot beam may multiplex a plurality of signals on each uplink 814 and each downlink 816. The multiplexing of the signals may be based on a count of user terminals 808 and/or gateways 810 transmitting or receiving data within a cell. Data is transmitted to the platform 802 from the user terminals 808 via the uplink 814a and data is received from the platform 802 at the user terminals 808 via the downlink 816a. Similarly, data is transmitted to the platform 802 from the gateway 810 via the uplink 814b and data is received from the platform 802 at the gateway 810 via the downlink 816b. The gateway 810 sends communication signals to the user terminal 808 via a forward link including the uplink 814b and the downlink 816a and the user terminal 808 sends communications signals to the gateway 810 via the return link including the uplink 814a and the downlink 816b.

Mesh connectivity between user terminals 808 in the same or different cells is also possible depending on the capabilities of the communications platform, i.e., the platform 802 or a satellite. While the disclosure is not limited to any frequency, certain frequency spectrums have been allocated for GEO satellite communications by regulatory bodies. These allocated frequencies are used in the example discussed herein. The example embodiment assumes the downlink 816a may use a frequency band between 18.3 and 18.8 GHz and 19.7 and 20.2 GHz.

The disclosure is not restricted to this frequency plan. If the methods and apparatus of disclosure are applied to LEO satellites or high altitude platforms, other frequency spectrum are available.

A system configuration manager 812 includes a processor, individual, or organization tasked with designing, developing, and/or maintaining the antennas 806, hardware 807, and other features of the platform 802. The system configuration manager 812 may determine a coverage area 820 to be serviced by the platform 802. The system configuration manager 812 may determine a set of cells and sub-cells within the coverage area 820 to be serviced by the platform 802. In exemplary embodiments, a sub-cell may be completely disposed within a boundary of cell. Cells and sub-cells within the coverage area 820 are not illustrated for clarity in FIG. 8.

The system configuration manager 812 may determine the antenna design needed to provide acceptable bandwidth to user terminals, including the number of antennas and the size of the antennas to maintain a specified directivity at the cell center and a beam width and the crossover ratio to maintain a specified directivity at the edge of the cell and the spacing of the cells. In some instances, the system configuration manager 812 may include a control link to configure the platform 802 based on a new set of coverage area 820 and Quality of Service (QoS) parameters. Depending on the capability of the platform 802, such parameters may include use of a hybrid-color reuse plan, new frequency assignments, new spot beam forming coefficients or new routing tables.

In exemplary embodiments, the system configuration manager 812 may also service and/or maintain the platform 802. For example, the system configuration manager 812 may transmit software updates while the platform 802 is operational, for example, in space. The system configuration manager 812 may also instruct the platform 802 to move to a new geographical location. The system configuration manager 812 may communicate with the platform 802 via the gateway 810 and/or a proprietary/private communication link. In some instances, the platform 802 may provide diagnostic and status information to the system configuration manager 812 via the proprietary/private communication link and/or through the gateway 810 multiplexed with communications traffic.

Example Design Considerations

One of the design goals of the hybrid reuse plan is to have a uniform user perceived QoS. It is reasonable to assume that the user terminals 808 are uniformly distributed within a coverage area 820 and that a uniform user perceived QoS requires a uniform distribution of capacity in terms of available user data rates. It is further desirable that all of the user terminal antennas and transceivers be similar in design, and be independent of their location within the coverage area 820. By suitable choice of parameters the perceived QoS can be uniform even if the user distribution is not uniform.

FIG. 9 shows the parametric inputs to the system configuration manager and outputs of the system configuration manager.

FIG. 9 shows a diagram of parametric inputs to the design process implemented by the system configuration manager 812 of FIG. 8. These inputs may change in time with improved technology and with new frequency spectrum allocations. Some of these design parameters are location dependent such as rainfall statistics and therefore rain fades. Some of these parameters are the choice of a service provider such as availability or terminal costs. In any event, design process of the system configuration manager 812 remains the same.

In order to estimate the user data rate available at any possible user terminal location within the coverage area 820, link budgets are computed assuming Shannon capacity and/or any set of modcods such as DVB-S2X.

The results of the system configuration process include satellite design parameters such as antenna apertures and required transmit power levels per cell. If the links do not close at the edge of coverage or if excessive transmit power is required then the input parameters must be re-evaluated. Design modifications include increasing the performance requirements on the user terminal 808 (i.e., more antenna gain), using a lower frequency with better rain attenuation performance, reducing the size of the coverage area 820 (i.e., increasing the minimum user terminal elevation angle), and/or using an alternative coverage area 820 embodiment by partitioning the coverage area 820 into more cells.

In exemplary embodiments, the system configuration manager 812 may output the $\tau$, T and r parameters to be used in a selected hybrid color reuse plan. The $\tau$ and T parameters may be used to determine a duty cycle of the hybrid frequency reuse plan and r may be used to determine the size of the sub-cell within the cell.

Flowchart of the Example Process

FIG. 10 illustrates a flow diagram showing an example procedure to configure antennas on a satellite to produce cells with a substantially uniform spatial spectral density, according to an example embodiment of the present disclosure.

FIG. 10 illustrates a process 1000 for configuring antennas and a color reuse plan on a platform 802 to construct a cell configuration that meet the QoS and capacity requirements, according to an example embodiment of the present disclosure.

Although the process 1000 is described with reference to the flow diagram illustrated in FIG. 10, it should be appreciated that many other methods of performing the functions associated with the process 1000 may be used. For example, the order of many of the blocks may be changed, certain blocks may be combined with other blocks, and many of the blocks described are optional. Further, the actions described in process 1000 may be performed among multiple devices.

The process 1000 operates on, for example, the system configuration manager 812 of FIG. 8. The process 1000 begins when a request (for example, request 1101 of FIG. 11) to provision a satellite (e.g., the platform 802 of FIG. 8) for a specified coverage area 820 is received and processed (block 1002), for example, by the system configuration manager 812. The request may include, for example the orbit at which the proposed satellite will operate. The request may also include Quality of Service (QoS), capacity requirements and terminal performance characteristics. Responsive to the request, the process 1000 determines an initial antenna size, cell and sub-cell size, color reuse plan and $\tau$ (block 1008). A preliminary edge-of-coverage link analysis may be performed at this time to ensure that the plan meets minimum QoS performance at the edge of the cell.

The process 1000 may use parametric inputs. The parametric inputs may include, for example, terminal design constraints, satellite antenna constraints, available spectrum, satellite power, size and weight constraints, or the like. Using the inputs, the process 1000 determines a satellite aperture size and directivity (block 1004).

The process 1000 may partition a coverage area, for example, the coverage area 820 into cells and sub-cells (block 1006). In some instances, the cells may be equal-sized. In exemplary embodiments, the cells may be hexagonal cells. In exemplary embodiments, the sub-cells may be disposed as elongated hexagons disposed within a boundary of the cells. After partitioning the coverage area 820, the process 1000 assigns an antenna beam to each of the cells (block 1010).

The process 1000 may determine a directivity for each antenna to provide communication coverage to the respective cell according to the bandwidth requirements and/or QoS requirements (block 1004). The process 1000 may then determine an aperture size and/or an antenna type for each of the antennas based, for example, on the determined beam width, gain, etc. (block 1004). The aperture size and/or an antenna type for each of the antennas may be based on link performance requirements specified in inputs 1001 and the availability of antenna designs. In block 1008, the process 1000 determines a duration $\tau$ during which time the satellite can transmit data to the terminals within the sub-cell using both frequencies. In general, $\tau$ and r may be independently selected for each cell.

The process 1000 may perform and analyze a link analysis to determine that there is adequate link margin for the required level of service (block 1010). The process confirms compliance with the design requirements at block 1012. If the analyzed link performance is not sufficient or does not comply with the design requirements, the process 1000 returns to block 1004. If the analyzed link performance is sufficient, the system is provisioned by configuring a platform at block 1014 and the process 1000 ends. In exemplary embodiments, when an antenna is for a mobile terminal, the process 1000 may be repeated for the mobile terminal when it has moved a predetermined distance. In some embodiments, when a phased array is used instead of individual antennas or reflector antennas with individual feeds, the system designer might configure the beam forming coefficients of the phased array to form new spot beams while the satellite is in orbit.

When design requirements are not met at block 1012, the process 1000 might modify the coverage area 820, antenna size, cell size, sub-cell size, or a combination thereof to provide sufficient margins per the design requirements. For example, a smaller coverage area 820 may be necessary or the number of cells may need to be increased.

FIG. 11 shows a block diagram example of a configuration manager, according to an example embodiment.

FIG. 11 shows a block diagram example of a configuration manager 812 including functional blocks needed to perform the tasks in the flow diagram 1000. The example configuration manager 812 may include an interface block 1102 to manage inputs, such as, system design parameters described in FIG. 9. In exemplary embodiments, the interface block 1102 may manage outputs, such as, cell locations, inner sub-cell locations, outer sub-cell locations, a frequency reuse plan and other design parameters shown in FIG. 9. The system configuration manager 812 may include sub-blocks, such as, a location processor 1104 to process user terminal or VSAT location data and density, and local information such as rain fade statistics. The system configuration manager 812 may include a link analyzer 1106 to calculate the Quality of Service QoS, including an Edge-of-Cell (EOC) QoS, at each terminal location based on a set of design parameters. The system configuration manager 812 may include a platform configurer 1108 to determine the set of design parameters such as cell and sub-cell locations and sizes and a color reuse plan including the value of $\tau$ for each cell, the value of r for each cell, and the like. Other design parameters include the platform antenna apertures, peak to edge directivity at the boundary of each cell, and platform transmit power per each beam. If the design parameters are met, for example, when the analyzed link performance is sufficient, a platform provision processor 1110 may provision the satellite into service per block 1112.

FIG. 13 illustrates a process for communicating in a multi-beam high capacity communications system that covers a geographic coverage area divided into a target cell including an inner sub-cell and an outer sub-cell, and nearby cells.

A process 1300 may a generate target signal at function 1302 intended for being focused on a target cell. At function 1304, the process 1300 may generate the target signal for 0 to $\tau$ with first color reuse plan, where this portion of the target signal is intended for a VSAT population disposed in an inner sub-cell of the target cell. At function 1306, the process 1300 may generate the target signal for $\tau$ to T with second color reuse plan, where this portion of the target signal is intended for a VSAT population disposed in an outer sub-cell of the target cell.

In some embodiments, the process 1300 may include a function 1312 to generate other signals (nearby signals) intended for being beamed to nearby cells of the target cell. At function 1314, the process 1300 may generate the target signal for 0 to $\tau_N$ with the first color reuse plan, where this portion of the target signal is intended for a VSAT population disposed in an inner sub-cell of one of the nearby cells. At function 1306, the process 1300 may generate the target signal for $\tau$ to T with the second color reuse plan, where this portion of the target signal is intended for a VSAT population disposed in an outer sub-cell of one of the nearby cells. In some embodiments, the time parameters $\tau$ may be equal. In some embodiments, the time parameters may be different. In some embodiments, $\tau_N$ may not be the same in all the nearby cells.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

The invention claimed is:

1. A high capacity communications system, the system comprising:
    a transmitter comprising
        a signal generator to generate a signal comprising, wherein for a first frame portion extending from zero to $\tau$ time the signal is generated per a first color reuse plan of a frequency spectrum and one or more polarizations, and for a second frame portion extending from $\tau$ to T the signal is generated per a second color reuse plan of the frequency spectrum and the one or more polarizations; and
        an RF system to beam the signal concurrently to a first geographic area and a second geographic areas,
    wherein
        $\tau$ is less than T,
        the first frame portion is intended for a first VSAT population disposed in the first geographic coverage area and the second frame portion is intended for a second VSAT population disposed in the second geographic coverage area, and
        the first color reuse plan maps the frequency spectrum and the one or more polarizations into fewer colors than the second color reuse plan.

2. The system of claim 1, wherein $\tau$ varies depending on the proportionality of the transmission capacity density provided to the first and second VSAT populations.

3. The system of claim 1, wherein $\tau$ is adjusted such that a transmission capacity density of the first frequency reuse plan during $\tau$ is substantially similar to a transmission capacity density of the second frequency reuse plan during $\tau$ to T.

4. The system of claim 1, wherein the one or more polarizations comprises two polarizations when using the first or second color reuse plan, and the first color reuse plan maps a different color to each of the two polarizations.

5. The system of claim 4, wherein the frequency spectrum is divided into two sub-bands when using the second color reuse plan and the second color reuse plan maps a different color to each sub-band and each of the two polarizations.

6. The system of claim 1, wherein the first color reuse plan maps a different color to each sub-band of the frequency spectrum divided into two sub-bands when using the first color reuse plan, and the second color reuse plan maps a different color to each sub-band of the frequency spectrum divided into four sub-bands when using the second color reuse plan.

7. A multi-beam high capacity communications system covering a geographic coverage area divided into a target cell comprising an inner sub-cell and an outer sub-cell, and nearby cells, the system comprising:
    a transmitter comprising
        a first signal generator to generate a target signal intended for the target cell, wherein, for a first frame portion extending from zero to $\tau$ time the target signal is generated per a first color reuse plan of a frequency spectrum and one or more polarizations, and for a second frame portion extending from $\tau$ to T the target signal is generated per a second color reuse plan of the frequency spectrum and the one or more polarizations;
        a second signal generator to generate nearby signals intended for a corresponding one of the nearby cells, each of the nearby signals comprising the frequency spectrum and the one or more polarizations; and
        a Radio Frequency (RF) system to concurrently focus the target signal as a target beam on the target cell and each of the nearby signals as nearby beams on the corresponding nearby cell,
    wherein
        $\tau$ is less than T,
        the first frame portion is intended for a first VSAT population disposed in the inner sub-cell and the second frame portion is intended for a second VSAT population disposed in the outer sub-cell, and
        the first color reuse plan maps the frequency spectrum and the one or more polarizations into fewer colors than the second color reuse plan.

8. The system of claim 7, wherein the one or more polarizations comprises two polarizations when using the first or second color reuse plan, and the first color reuse plan maps a different color to each of the two polarizations.

9. The system of claim 8, wherein the frequency spectrum is divided into two sub-bands when using the second color reuse plan and the second color reuse plan maps a different color to each sub-band and each of the two polarizations.

10. The system of claim 7, wherein τ is adjusted such that a transmission capacity density of the first frequency reuse plan during τ is substantially similar to a transmission capacity density of the second frequency reuse plan during τ to T.

11. The system of claim 7, wherein the τ is configured with disproportionate amounts of bandwidth capacity such that the inner sub-cell provides more bandwidth capacity as compared to a bandwidth capacity of the outer sub-cell.

12. The system of claim 7, wherein the inner sub-cell is enclosed by the outer-sub-cell of the target cell.

13. The system of claim 7, wherein the cell is shaped substantially as a hexagon and the inner sub-cell is shaped substantially as an elongated hexagon.

14. The system of claim 7, wherein at least one of the nearby signals is generated per the second frequency reuse plan for at least a portion of the time from 0 to T.

15. The system of claim 7, further comprising a high attitude platform or satellite, wherein the RF generator transmitter is disposed in the high attitude platform or satellite, and the first signal generator is disposed in the high attitude platform or satellite.

16. The system of claim 7, further comprising a high attitude platform or satellite, wherein the RF generator transmitter is disposed in the high attitude platform or satellite, and the first signal generator is disposed remote from the high attitude platform or satellite.

17. The system of claim 7, wherein the inner sub-cell is shaped substantially by a distance r from a cell center of the target cell to a contour line with a desired value of Carrier signal-to-Noise+Interference ratio C/(I+N) between the target beam and the nearby beams.

18. The system of claim 7, wherein the target cell comprises a plurality of target cells, and the τ for at least one of the plurality of target cells is different than another one of the plurality of target cells.

19. The system of claim 7, wherein the target cell comprises a plurality of target cells, wherein the inner sub-cell of each of the target cells is shaped substantially by a distance r from a cell center of the respective target cell to a contour line with a desired value of Carrier signal-to-Noise+Interference ratio C/(I+N) between the respective target beam and the respective nearby beams.

20. A method for communicating in a multi-beam high capacity communications system covering a geographic coverage area divided into a target cell comprising an inner sub-cell and an outer sub-cell, and nearby cells, the method comprising:
generating a target signal intended for the target cell, wherein, for a first frame portion extending from zero to τ time the target signal is generated per a first color reuse plan of a frequency spectrum and one or more polarizations, and for a second frame portion extending from τ to T the target signal is generated per a second color reuse plan of the frequency spectrum and the one or more polarizations;
generating nearby signals intended for a corresponding one of the nearby cells, each of the nearby signals comprising the frequency spectrum and the one or more polarizations; and
concurrently beaming the target signal as a target beam on the target cell and each of the nearby signals as nearby beams on the corresponding nearby cell,
wherein
τ is less than T,
the first frame portion is intended for a first VSAT population disposed in the inner sub-cell and the second frame portion is intended for a second VSAT population disposed in the outer sub-cell, and
the first color reuse plan maps the frequency spectrum and the one or more polarizations into fewer colors than the second color reuse plan.

21. The method of claim 20, wherein the one or more polarizations comprises two polarizations when using the first or second color reuse plan, and the first color reuse plan maps a different color to each of the two polarizations.

22. The method of claim 21, wherein the frequency spectrum is divided into two sub-bands when using the second color reuse plan and the second color reuse plan maps a different color to each sub-band and each of the two polarizations.

23. The method of claim 21, wherein the frequency spectrum is divided into three sub-bands when using the second color reuse plan, and the second color reuse plan maps a different color to each sub-band and each of the two polarizations.

24. A high capacity communications configuration system to configure a high attitude platform or satellite focused on a geographic coverage area divided into a target cell comprising an inner sub-cell and an outer sub-cell, and nearby cells, the system comprising:
a first frequency reuse plan of a frequency spectrum and one or more polarizations for generating a first frame portion of a signal extending from zero to τ time, wherein the first frame portion is to be transmitted to a first VSAT population disposed in the inner sub-cell;
a second frequency reuse plan of the frequency spectrum and the one or more polarizations for generating a second frame portion extending from τ to T, wherein the second frame portion is to be transmitted to a second VSAT population disposed in the outer sub-cell; and
a system configuration manager to determine a size and disposition of the target cell and each of the nearby cells, and to determine a size and disposition of the inner sub-cell and the outer sub-cell,
wherein
T is a duration of a frame comprising the first frame portion and the second portion,
τ is less than T, and
the first color reuse plan maps the frequency spectrum and the one or more polarizations into fewer colors than the second color reuse plan.

25. The system of claim 24, wherein the system configuration manager is configured to determine the τ.

26. The system of claim 24, wherein the system configuration manager is configured to analyze link performance, Edge-of-Cell (EOC) Quality of Service (QoS) and capacity.

27. The system of claim 24, wherein the system configuration manager is configured to determine the size of the target cell, the size of the inner sub-cell and the disposition of the inner sub-cell such that the inner sub-cell is shaped substantially by a distance r from a cell center of the target cell to a contour line with a desired value of Carrier signal-to-Noise+Interference ratio C/(I+N) between the target beam and the nearby beams.

* * * * *